(12) United States Patent
Moore et al.

(10) Patent No.: US 7,328,440 B2
(45) Date of Patent: Feb. 5, 2008

(54) INTERFACE BETWEEN FRONT-END SYSTEMS AND BACK-END SYSTEMS

(75) Inventors: David Carlton Moore, Antioch, TN (US); Ryan Kettrey, Antioch, TN (US); Raman Trikkur, Nashville, TN (US); Steven M. Glisson, Jonesboro, AR (US); Dane Luke Appalsammy, Smyrna, TN (US)

(73) Assignee: GXS, Inc., Gaithersburg, MD (US)

( * ) Notice: Subject to any disclaimer, the term of this patent is extended or adjusted under 35 U.S.C. 154(b) by 799 days.

(21) Appl. No.: 09/741,860

(22) Filed: Dec. 22, 2000

(65) Prior Publication Data

US 2002/0124045 A1 Sep. 5, 2002

(51) Int. Cl.
*G06F 9/46* (2006.01)
*G06F 9/54* (2006.01)
*G06F 17/30* (2006.01)
*G06Q 99/00* (2006.01)

(52) U.S. Cl. .......................... 719/328; 719/311; 707/4; 707/10

(58) Field of Classification Search ................ 709/310; 707/4, 10; 719/311, 328, 310
See application file for complete search history.

(56) References Cited

U.S. PATENT DOCUMENTS 6,286,028 B1 * 9/2001 Cohen et al. ............... 709/202
6,434,555 B1 * 8/2002 Frolund et al. ................ 707/4
6,601,233 B1 * 7/2003 Underwood ................ 717/102
6,732,175 B1 * 5/2004 Abjanic ...................... 709/227

OTHER PUBLICATIONS

"Designing a flexible services-based architecture for Internet Applications", Mehra et al. Jan. 2000.*
"Unifying Heterogeneous Information Models" Singh, May 1998.*

* cited by examiner

Primary Examiner—Li B. Zhen
(74) Attorney, Agent, or Firm—Foley & Lardner LLP

(57) ABSTRACT

An interface (1) interfaces between front-end systems and back-end systems (10, 11, 12) in a manner whereby their communication formats may be different and they may change. There is an engine (2), a node layer of nodes (3, 4) and a utility layer of utilities (5, 6, 7). An engine (2) has an engine object which instantiates processor, script loader, parser, and script builder objects. An XML script contains a process map for associating incoming messages from the front-end systems with nodes (3, 4). The association is determined by the parser object. The engine has no specific business logic, this logic being represented by the nodes. The nodes expose their business logic capabilities to the engine (2), allowing it to dynamically maintain its process map. Messages are routed to the relevant nodes, which communicate with the relevant back-end systems via the utilities (5, 6, 7). Messages are passed between the nodes and the engine objects using a hashtable associating keys with values.

20 Claims, 1 Drawing Sheet

INTERFACE BETWEEN FRONT-END SYSTEMS AND BACK-END SYSTEMS

BACKGROUND OF THE INVENTION

The invention relates to performance of tasks by back-end systems.

At present, organisations such as financial institutions devote considerable manpower to integration of front-end systems with legacy back-end systems. The back-end systems are often very efficient at carrying out intensive transaction processing tasks and it is desirable to minimise the impact of changes at the front-end on the back-end systems. It is also desirable to allow flexibility for modification of the back-end systems.

It is an objective of the invention to provide an interface to reduce the manpower required for interfacing when changes are made to a front-end system.

A related objective is to provide greater flexibility to organisations for modification of front-end systems.

SUMMARY OF THE INVENTION

The invention provides an interface for interfacing between front-end data processing systems and back-end data processing systems, the interface comprising an engine, a node layer comprising at least one node, and a utility layer comprising at least one utility, and in which:
- the engine comprises means for receiving a message containing a request from a front-end system for a transaction to be performed by a back-end system, and means for interpreting said message to select a relevant node for interfacing,
- each node represents business logic interfaces to a back-end system,
- each node exposes business logic capabilities to the engine;
- the engine comprises means for using the exposed node business logic capabilities to build a process map linking received request messages with nodes;
- each utility is coupled as a proxy to a back-end system, comprises means for receiving a transaction request from a node, for converting said request to a back-end system request, for receiving a response from the back-end system, and for routing a response to the requesting node,
- each node comprises means for routing a received response to the engine; and
- the engine comprises means for routing a response to the requesting front-end system.

In one embodiment, the engine comprises means for dynamically maintaining the process map according to the exposed node business logic capabilities.

In one embodiment, the process map comprises a script file.

In one embodiment, the process map comprises script messages, each message having a map associating incoming parameter names with standardised names.

In one embodiment, each message of the process map specifies an associated node, a list of the parameters the node requires, and values which it returns for a type of incoming message.

In one embodiment, the utilities comprise means for interfacing with the node layer according to a uniform interface model.

In one embodiment, the engine comprises means for calling a plurality of nodes for a transaction request.

In another embodiment, the engine comprises means for calling nodes in sequence, and for passing the output from a previous node to a next node.

In one embodiment, the engine and each node comprise means for using a hashtable mapping keys to values for passing data and control to each other.

In a further embodiment, the engine and the nodes each comprise means for using a hashtable for returning a result from a back-end system.

In one embodiment, the engine comprises means for requesting a return value for a transaction, and each node comprises means for defaulting to not passing a return value if one is not so requested.

In one embodiment, each of the engine and each node comprise an object instantiated from an object-oriented class.

In one embodiment, each of the engine and each node comprises means for using a hashtable which maps keys to values for passing data and control to each other, and the engine comprises means for passing a hashtable as a parameter in an execute method, a commit method, and a rollback method of a node object.

In another embodiment, the engine comprises means for activating a sequence of nodes for a transaction, and each node comprises means for performing a rollback if a transaction fails.

In one embodiment, the engine comprises an externally visible engine class, an object of which comprises means for instantiating:
- a processor object for instantiating said node objects; and
- a loader object for loading the process map, and for determining node objects associated with a received message.

In one embodiment, the engine comprises means for instantiating a parser object for parsing a received message, for placing extracted data in a hashtable, and for returning the hashtable to the engine object.

In one embodiment, the engine comprises a builder object comprising means for automatically updating the process map according to capabilities exposed by node classes.

In one embodiment, each node class comprises a method for returning a string to the engine indicating the node capabilities.

According to another embodiment, the invention provides an interface for interfacing between front-end data processing systems and back-end data processing systems, the interface comprising an engine, a node layer comprising at least one node, and a utility layer comprising at least one utility, and in which:
- the engine comprises means for receiving a message containing a request from a front-end system for a transaction to be performed by a back-end system, and means for interpreting said message to select a relevant node for interfacing,
- each node represents business logic interfaces to a back-end system,
- each node exposes business logic capabilities to the engine;
- the engine comprises means for using the exposed node business logic capabilities to build a process map linking received request messages with nodes;
- each utility is coupled as a proxy to a back-end system, comprises means for receiving a transaction request from a node, for converting said request to a back-end system request, for receiving a response from the back-end system, and for routing a response to the requesting node, each node comprises means for routing a received response to the engine, the engine comprises means for routing a response to the requesting front-end system, each of the engine and each node comprises an object instantiated from an object-oriented class, and each of the engine and each node comprises means for using a hashtable which maps keys to values for passing data and control to each other, and the engine comprises means for passing a hashtable as a parameter in an execute method, a commit method, and a rollback method of a node object.

According to another aspect, the invention provides a method of interfacing between front-end data processing systems and back-end data processing systems, the method being performed by an interface comprising an engine for communicating with the front-end systems and a utility layer for communicating with the back-end systems, the method comprising the steps of:

the engine receiving from a front-end system a message incorporating a request for a transaction to be performed by a back end system but not indicating a particular back-end system suitable for the transaction, the engine using a process map to select one of a plurality of nodes in a node layer which may provide a suitable link to the back-end systems for the request, the process map linking message types to nodes according to exposed business logic capabilities of the nodes, the engine passing a request to the selected node, the selected node communicating with a utility with which it is associated to instruct the utility to perform the transaction, receiving a response from the utility, and passing the response back to the node, the node passing the response back to the engine, and the engine passing the response back to the requesting front-end.

In One Embodiment:

the engine dynamically creates a node object according to parameters retrieved from the process map, the engine passes data from the received message to the created node, and data is passed between the node object and the engine by passing a hashtable linking keys with associated data.

In one embodiment, the engine passes a hashtable as a parameter in an execute method, a commit method, and a rollback method, and the node rolls back according to the rollback method if the transaction fails.

In one embodiment, the process map is an XML script file.

BRIEF DESCRIPTION OF THE DRAWINGS

The invention will be more clearly understood from the following description of some embodiments thereof, given by way of example only with reference to the accompanying drawing in which.

DETAILED DESCRIPTION OF THE INVENTION

Figure 1:
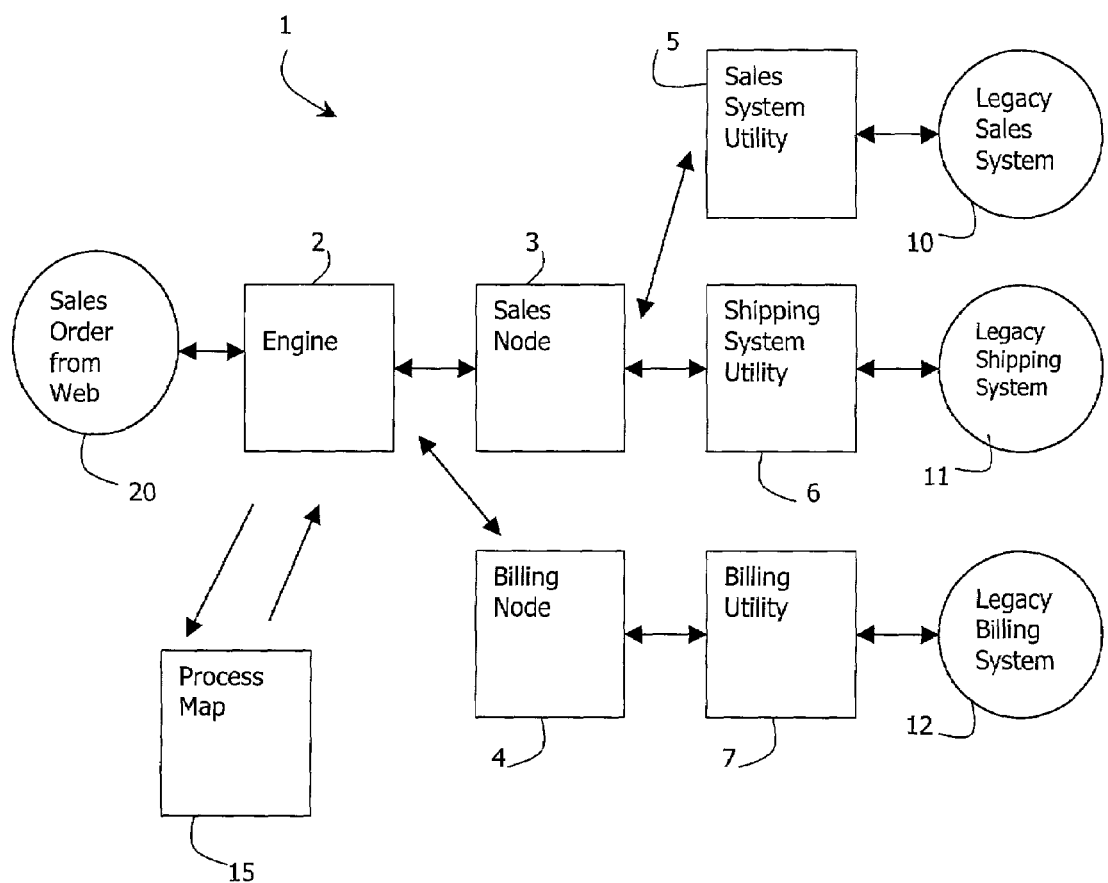
FIG. 1 is a diagram illustrating the architecture of an interface of the invention.

Referring to FIG. 1, an interface 1 interfaces between sales order processing front end systems (not shown) and legacy back-end systems. The front end system may, for example, be a Web server allowing business-to-business sales. The latter are a sales system 10, a shipping system 11, and a billing system 12. The interface 1 comprises an engine 2, a node layer, and a utility layer. The node layer comprises a sales node 3 and a billing node 4. The sales node 3 is coupled to a sales system utility 5 and to a shipping system utility 6. The billing node 4 is coupled to a billing utility 7. This illustration is of the interface 1 in the process of handling transactions. The nodes 3 and 4 are not stable, they are dynamically created by the engine 2 in real time.

The engine is a processing unit that receives instructions on tasks to be performed (messages) and the data needed to perform the task. It contains no business-specific logic. It interprets the message and activate the appropriate nodes to process the task. The engine 2 uses and maintains a process map 15 that matches received messages with the nodes that process that messages.

The nodes are business logic interfaces to back-end systems. Node classes expose their capabilities in terms of business tasks to be completed and/or messages handled. The exposed information is used by the engine 2 to build the process map 15. Nodes may use any number of utility components.

The utilities directly access back end systems. They may all have different interfaces, but are built on an interface model such that their implementation can change without affecting the caller. However, if a change to the interface is required, it is still isolated from the originator of the task at the node level. Each utility serves as a proxy for a back end system, providing a standardised language an invocation method for the nodes. Each utility is an object, and each node class is coded with the attributes of associated utilities.

In the example of FIG. 1, a sales order comes in from the Web to the engine 2. The engine 2 looks in the process map 15 and finds that the sales and classes should be instantiated to create the nodes 3 and 4. It passes the order message and relevant data to the respective nodes. The sales node 3 contains the business logic that it must make particular calls into the sales system 10 and the shipping system 11, which it does by way of the utilities 5 and 6. The billing node 4 contains logic that it needs to make a call into the billing system 12, which it does by way of the billing utility 7.

This allows for all business logic to be contained in the process map 15 and the node classes. If a new process needs to occur, simply writing a new node class and adding it to the process map 15 will integrate it into the system. If a new back-end sales system is purchased, changes can be made to just the sales system utility to access it, thus limiting changes and decreasing the chance of bugs in the system. However, if the utility interface is insufficient, the change can still be isolated at the node level.

Hash tables are used for passing of messages and data, and the following summarises operation of the interface 1.

1. A message is received at the interface 1.
2. Nodes are created to handle the message.
3. The engine takes the details of the message and puts them in a hashtable.
4. This hashtable is passed to a node.
5. The node retrieves data that it requires from the hashtable.
6. The node accesses one or more utility objects to achieve its objective.
7. The node can insert data into the hashtable.
8. Steps 4 & 5 are repeated for each node that handles the message.

9. Data to be returned to the request originator is retrieved from the hashtable and sent back over a message bus. This is controlled by a RETURN MESSAGE description in the process map 15. Thus, the caller only receives the requested information, thus minimising used bandwidth on the message bus.

In more detail, the engine 2 uses the process map 15 to determine which nodes need to be created when a message (such as a SALESORDER) arrives. The message could be in any format. The engine 2 interprets it and places it in a standard format for the nodes. The engine 2 then creates the node objects based on their class and location and calls them with the message and the parameters in the standardised format. As the engine 2 calls each of the nodes in order, it accepts the output from the previous node and passes it to the next node. This allows for resolution of processing dependencies.

The following object-oriented classes comprise the engine 2.

Engine. This is an externally visible class that instantiates and coordinates access to EngineProcessor and EngineScripLoader classes. This allows the engine 2 to be scalable. Multiple EngineProcessors could be running at the same time.

EngineProcessor. This class finds out which nodes should be executed for a particular message and then loads those classes and makes the appropriate calls.

EngineScriptLoader. This loads the process map XML configuration script. This object can reload the script while the engine 2 is processing. This decreases downtime and allows for customisation while processing continues.

EngineMessageParser—This is for parsing an incoming message. This class is abstracted away from the Engine object so the message formats can change without affecting the rest of the code.

EngineScriptBuilder is a class which updates the process map script XML file with the capabilities of a new node. This class allows for easier maintenance and deployment, since the modifications needed to add a new node to the system can be done by the computer.

The following are the node classes.

NodeData. This class contains all the information necessary to locate a node and execute its methods. The abstraction of this class allows for handling of special cases of nodes to be created. For example an Enterprise Java Bean NodeData object could process differently from the normal one, but the engine 2 will not need to change to handle this special new node type. The NodeData object is capable of creating the node even when it is on a different hardware platform, allowing the engine to work as a distributed system for improved performance and scalability.

MessageData—This class maintains all the nodes associated with a particular message.

The following describes operation of the interface 1 in more detail:

Start Up

The engine 2 is started on the system.

The engine creates an EngineScripLoader object which parses the process map XML file. Parsing of the XML file only needs to be done once per Engine object initialisation, for improved performance. The EngineScriptLoader object uses the information in the XML file to create a MessageData object for each message the engine 2 can handle.

The EngineScriptLoader object creates a NodeData entry in each MessageData object for each node that wants to execute when the message is received.

The MessageData objects sort their NodeData entries based upon descriptions of their inputs and outputs and any designated order attributes as declared in the XML file 15, with the end result that it knows the proper order in which to call the nodes. This allows for small nodes to be plugged into the system to solve larger tasks in combination.

Message Processing

A message is passed to the Engine class. The Engine class creates an instance of an EngineMessageParser, passing it the message to process. The EngineMessageParser extracts the relevant information from the message, placing it in a hashtable, and returning it to the Engine. The Engine class creates an instance of an EngineProcessor object, passing it a reference to the EngineScriptLoader and the hashtable result from the EngineMessageParser. The EngineProcessor requests the MessageData object corresponding to the message received from the EngineScriptLoader. The EngineProcessor begins making calls into the NodeData objects stored in the MessageData object passing the hashtable from the message. Each node can modify, add, or delete values from this hashtable as it passes between nodes. Thus they can be constructed to rely on a predecessor. If a node should fail, aft preceding nodes are told to rollback whatever they have done as a result of processing. Otherwise, when all nodes have been called and none have reported errors, they are all told to commit their changes.

Finally, if a return message is listed in the MessageData object, its description is retrieved and the message is constructed and sent back to the originator of the request.

Script Modification

The script can be modified by hand, by a custom editor or automatically. Automatic script modification is accomplished by a call to the engine passing in a new node. The new node contains a method which will return XML describing the messages the node is able to process, the inputs it expects, and the outputs it produces. The Engine creates an EngineScriptBuilder object which automatically merges this information with the current XML script. The Engine then issues a request to the EngineScriptLoader to reload its information from the newly changed file.

Node Implementation

The nodes are required to implement the following methods:
```
/**
* This method is used to verify that all necessary
* data to complete an operation is available.
*/
public boolean Execute (String task, String taskID, Hash-
    table values)throws Exception;
/**
* This method returns an XML string that describes the tasks
* this Node can perform and the parameters it uses.
*/
public String TasksProvided( ) throws Exception;
/**
* This method is either used to do the execution of the task,
* or to commit the task with the supplied taskID.
*/
public void Commit(String task, String taskID, Hashtable
    values);
/**
* This method rolls back a particular operation.
```

*/
public void Rollback(String task, String taskID, Hashtable values);

This interface based access to the nodes allows the engine to communicate in a standard way to any system it is integrated with, allowing new nodes to be added without requiring changes to the engine.

The following is a sample of a process map XML file for a purchase request.

```xml
<?xml version="1.0"?>
<MESSAGES>
    <ONLINEPURCHASE>
        <DDMAP>
            <MSG ddname="message"/>
            <NAME ddname="customerName"/>
            <ADDR ddname="customerAddress"/>
            <RETVAL ddname="ReturnValue"/>
        </DDMAP>
        <NODES>
            <SALESNODE class="Sales" location="file:F:\" order="1">
                <PARAMETERS>
                    <message />
                    <customerName />
                    <ReturnValue in="false" out="true"/>
                </PARAMETERS>
            </SALESNODE>
            <BILLINGNODE class="Billing" location="file:F:\\" order="2">
                <PARAMETERS>
                    <message />
                    <customerName />
                    <customerAddress />
                    <ReturnValue in="true" out="true"/>
                </PARAMETERS>
            </BILLINGNODE>
            <SHIPPINGNODE class="Shipping" location="file:F:\\" >
                <PARAMETERS>
                    <message in="true" out="false"/>
                    <customerName />
                    <customerAddress />
                    <ReturnValue in="false" out="true"/>
                </PARAMETERS>
            </SHIPPINGNODE>
        </NODES>
        <RETURNMESSAGE name="ReturnFromOnlinePurchase">
            <RETVAL />
        </RETURNMESSAGE>
    </ONLINEPURCHASE>
    <ONLINERETURN>
        <DDMAP>
            <MSG ddname="message"/>
        </DDMAP>
        <NODES>
            <SERVICENODE class="CustomerService" location="file:F:\" order="1">
                <PARAMETERS>
                    <message />
                    <ReturnValue in="false" out="true"/>
                </PARAMETERS>
            </SERVICENODE>
        </NODES>
    </ONLINERETURN>
</MESSAGES>
```

As set out above, the XML script is organised into messages. Within each message is a DDMap which describes the incoming parameter names and associates them to standardised names. For example, in the ONLINEPURCHASE message there is a parameter "MSG". When passing this parameter to the nodes it should be called "message". This is to help standardise node interfacing.

There is a NODE section for each message which contains the nodes that should be called for the message. Under each node entry is a list of the parameters the node requires and those values that is returns. If there is no "in" or "out" designator, the parameter is assumed to be "in" only. These are the values used by the EngineScriptLoader about to decide the execution order of the nodes. The map 15 also designate the node order.

Within each message section, there may be a RETURNMESSAGE designator. This is the message that should be constructed and returned to the originator of the request. The "name" designator is the name of the message to return. The sub-entries are the names of the return values to pull out of the hashtable of values that were passed to the nodes during processing. These will be bundled up into the return message.

Regarding the hashtables, they are used to store and retrieve information passed between nodes as well as the engine by giving them field names. For example, "CustomerFirstName" might be mapped to "David" in the table. One node could retrieve it from a database and store it under "CustomerFirstName", and a subsequent node which needs that information could go the hashtable and request the value of "CustomerFirstName" and be provided "David". A hashtable is passed as a parameter in the Execute, Commit, and Rollback methods of the node object. The hashtables essentially map a key to a value. Keys in a hashtable are unique.

Values that are placed in the hashtable are "message" and "ReturnValue". "message" might contain something like "Please send via 2nd day air. " which could be retrieved by the node so it could store that in with the customer's order for special handling. "ReturnValue" would contain the result of the operations. For example, after all the nodes process, one of the nodes might have placed "Total shipping cost is $24.00" under "ReturnValue" in the hashtable, so that the engine can send that back to the front end, allowing it to display the cost to the user. In the RETURNMESSAGE section, it would have to designate "ReturnValue" as being of interest to the front end, so that it would return that value to the front end.

It will be appreciated that the invention provides excellent versatility in choice and configuration of front-end and back-end systems. Very little programming is required for configuration changes, particularly as the EngineScriptBuilder object automatically maintains the process map. Another advantage is versatility in the nature of requests and responses by virtue of use of hashtables as described. Also, the reply mechanism provides for a low message bus bandwidth requirement. Another benefit of the architecture is the fact that the interface 1 achieves full transactional capability. (i.e. commit, rollback).

It will also be appreciated that the manner in which the interface 1 operates leads to excellent data integrity. The invention also removes dependencies between back end systems in a very effective manner.

The invention is not limited to the embodiments described but may be varied in construction and detail.

The invention claimed is:

1. An interface stored on a computer-readeable medium for interfacing between front-end data processing systems and back-end data processing systems, the interface comprising an engine, a node layer comprising at least one node, and a utility layer comprising at least one utility, and in which:
   the engine is configured to receive a message containing a request from a front-end system for a transaction to be performed by a back-end system, said message not containing an operation identifier of the transaction to be performed, and interpreting said message to select a relevant node from a plurality of nodes for interfacing, wherein the engine does not contain any business logic,
   each node represents business logic interfaces to a back-end system,
   each node exposes business logic capabilities to the engine;
   the engine comprises means for using the exposed node business logic capabilities to automatically build a process map linking received request messages with nodes, wherein the engine uses the process map to select the relevant node from the plurality of nodes, the process map comprising script messages, each message specifying an associated node, a list of the parameters the node uses to perform operations based on the received request messages, and values which it returns for a type of incoming message;
   each utility is coupled as a proxy to a back-end system, and is configured for receiving a transaction request from a node, for converting said request to a back-end system request, for receiving a response from the back-end system, and for routing a response to the requesting node,
   each node routes a received response to the engine; and the engine routes a response to the requesting front-end system,
   wherein each of the engine and each node comprise an object instantiated from an object-oriented class, and
   wherein each of the engine and each node is configured for using a hashtable which maps keys to values for passing data and control to each other, and the engine is configured for passing a hashtable as a parameter in an execute method, a commit method, and a rollback method of a node object.

2. The interface as claimed in claim 1, wherein the engine dynamically maintains the process map according to the exposed node business logic capabilities.

3. The interface as claimed in claim 2, wherein the process map comprises a script file.

4. The interface as claimed in claim 3, wherein each message of the process map has a map associating incoming parameter names with standardized names.

5. The interface as claimed in claim 1, wherein the utilities interface with the node layer according to a uniform interface model.

6. The interface as claimed in claim 1, wherein the engine calls a plurality of nodes for a transaction request.

7. The interface as claimed in claim 6, wherein the engine is configured for calling nodes in sequence, and for passing the output from a previous node to a next node.

8. The interface as claimed in claim 1, wherein the engine and each node uses a hashtable mapping keys to values for passing data and control to each other.

9. The interface as claimed in claim 8, wherein the engine and the nodes each use a hashtable for returning a result from a back-end system.

10. The interface as claimed in claim 9, wherein the engine requests a return value for a transaction, and each node is configured for defaulting to not passing a return value if one is not so requested.

11. The interface as claimed in claim 1, wherein the engine is configured for activating a sequence of nodes for a transaction, and each node is configured for performing a rollback if a transaction fails.

12. The interface as claimed in claim 1, wherein the engine comprises an externally visible engine class, an object of which comprises means for instantiating:
   a processor object for instantiating said node objects; and
   a loader object for loading the process map, and for determining node objects associated with a received message.

13. The interface as claimed in claim 12, wherein the engine is configured for instantiating a parser object for parsing a received message, for placing extracted data in a hashtable, and for returning the hashtable to the engine object.

14. The interface as claimed in claim 12, wherein the engine comprises a builder object configured for automatically updating the process map according to capabilities exposed by node classes.

15. The interface as claimed in claim 1, wherein each node class comprises a method for returning a string to the engine indicating the node capabilities.

16. The interface stored on a computer-readable medium for interfacing between front-end data processing systems and back-end data processing systems, the interface comprising an engine, a node layer comprising at least one node, and a utility layer comprising at least one utility, and in which:

the engine comprises means for receiving a message containing a request from a front-end system for a transaction to be performed by a back-end system, the message not including an operation identifier of the transaction to be performed, and means for interpreting said message to select a relevant node from a plurality of nodes for interfacing;

each node represents business logic interfaces to a back-end system, each node exposes business logic capabilities to the engine;

the engine comprises means for using the exposed node business logic capabilities to automatically build a process map linking received request messages with nodes, wherein the engine uses the process map to select the relevant node from the plurality of nodes;

each utility is coupled as a proxy to a back-end system, comprises means for receiving a transaction request from a node, for converting said request to a back-end system request, for receiving a response from the back-end system, and for routing a response to the requesting node, each node comprises means for routing a received response to the engine, the engine comprises means for routing a response to the requesting front-end system, each of the engine and each node comprises an object instantiated from an object-oriented class, and each of the engine and each node comprises means for using a hashtable which maps keys to values for passing data and control to each other, and the engine comprises means for passing a hashtable as a parameter in an execute method, a commit method, and a rollback method of a node object.

17. A method of interfacing between front-end data processing systems and back-end data processing systems, the method being performed by an interface comprising an engine for communicating with the front-end systems and a utility layer for communicating with the back-end systems, the method comprising the steps of:

the engine receiving from a front-end system a message incorporating a request for a transaction to be performed by a back end system but not indicating a particular back-end system suitable for the transaction, wherein the message does not include an operation identifier identifying the transaction to be performed, the engine using a process map to select one of a plurality of nodes in a node layer which may provide a suitable link to the back-end systems for the request, the process map being automatically built to link message types to nodes according to exposed business logic capabilities of the nodes and comprising script messages, each message specifying an associated node, a list of the parameters the node uses to perform operations based on the received message, and values which it returns for a type of incoming message, wherein the engine does not contain any business logic, the engine passing a request to the selected node, the selected node communicating with a utility with which it is associated to instruct the utility to perform the transaction, receiving a response from the utility, and passing the response back to the node, and the node passing the response back to the engine, and the engine passing the response back to the requesting front-end system, wherein:

the engine dynamically creates a node object according to parameters retrieved from the process map, the engine passes data from the received message to the created node object, data is passed between the node object and the engine by passing a hashtable linking keys with associated data, and the engine passes a hashtable as a parameter in an execute method, a commit method, and a rollback method, and the node rolls back according to the rollback method if the transaction fails.

18. The method as claimed in claim 17, wherein the process map is an Extensible Markup Language (XML) script file.

19. A computer program product comprising software code stored on a computer-readable medium, that when executed on a computing system, performs a method of interfacing between front-end data processing systems and back-end data processing systems, the method being performed by an interface comprising an engine for communicating with the front-end systems and a utility layer for communicating with the back-end systems, the method comprising the steps comprising:

the engine receiving from a front-end system a message incorporating a request for a transaction to be performed by a back end system but not indicating a particular back-end system suitable for the transaction, the message not including an operation identifier of the transaction to be performed, the engine using a process map to select one of a plurality of nodes in a node layer which may provide a suitable link to the back-end systems for the request, the process map automatically linking message types to nodes according to exposed business logic capabilities of the nodes and comprising script messages, each message specifying an associated node, a list of the parameters the node uses to perform operations based on the received message, and values which it returns for a type of incoming message, wherein the engine does not contain any business logic, the engine passing a request to the selected node, the selected node communicating with a utility with which it is associated to instruct the utility to perform the transaction, receiving a response from the utility, and passing the response back to the node, and the node passing the response back to the engine, and the engine passing the response back to the requesting front-end system, wherein each of the engine and each node comprise an object instantiated from an object-oriented class, and wherein each of the engine and each node is configured for using a hashtable which maps keys to values for passing data and control to each other, and the engine is configured for passing a hashtable as a parameter in an execute method, a commit method, and a rollback method of a node object.

20. The interface stored on a computer-readable medium for interfacing between front-end data processing systems and back-end data processing systems, the interface comprising an engine, a node layer comprising at least one node, and a utility layer comprising at least one utility, and in which:

the engine comprises a receiving component configured to receive a message containing a request from a front-end system for a transaction to be performed by a back-end system, the message not including an operation identifier of the transaction to be performed, and an interpreting component configured to interpret said message to select a relevant node from a plurality of nodes for interfacing;

each node represents business logic interfaces to a back-end system, each node exposes business logic capabilities to the engine;

the engine comprises an automatic building component configured to use the exposed node business logic capabilities to automatically build a process map linking received request messages with nodes, wherein the engine uses the process map to select the relevant node from the plurality of nodes;

each utility is coupled as a proxy to a back-end system, comprises a receiving, converting and routing component configured to receive a transaction request from a node, to convert said request to a back-end system request, to receive a response from the back-end system, and to route a response to the requesting node, each node comprises a first routing component configured to route a received response to the engine, the engine comprises a second routing component configured to route a response to the requesting front-end system, each of the engine and each node comprises an object instantiated from an object-oriented class, and each of the engine and each node comprises a hashtable component configured to use a hashtable which maps keys to values for passing data and control to each other, and the engine comprises a passing component configured to pass a hashtable as a parameter in an execute method, a commit method, and a rollback method of a node object.

* * * * *